United States Patent Office 2,954,986
Patented Oct. 4, 1960

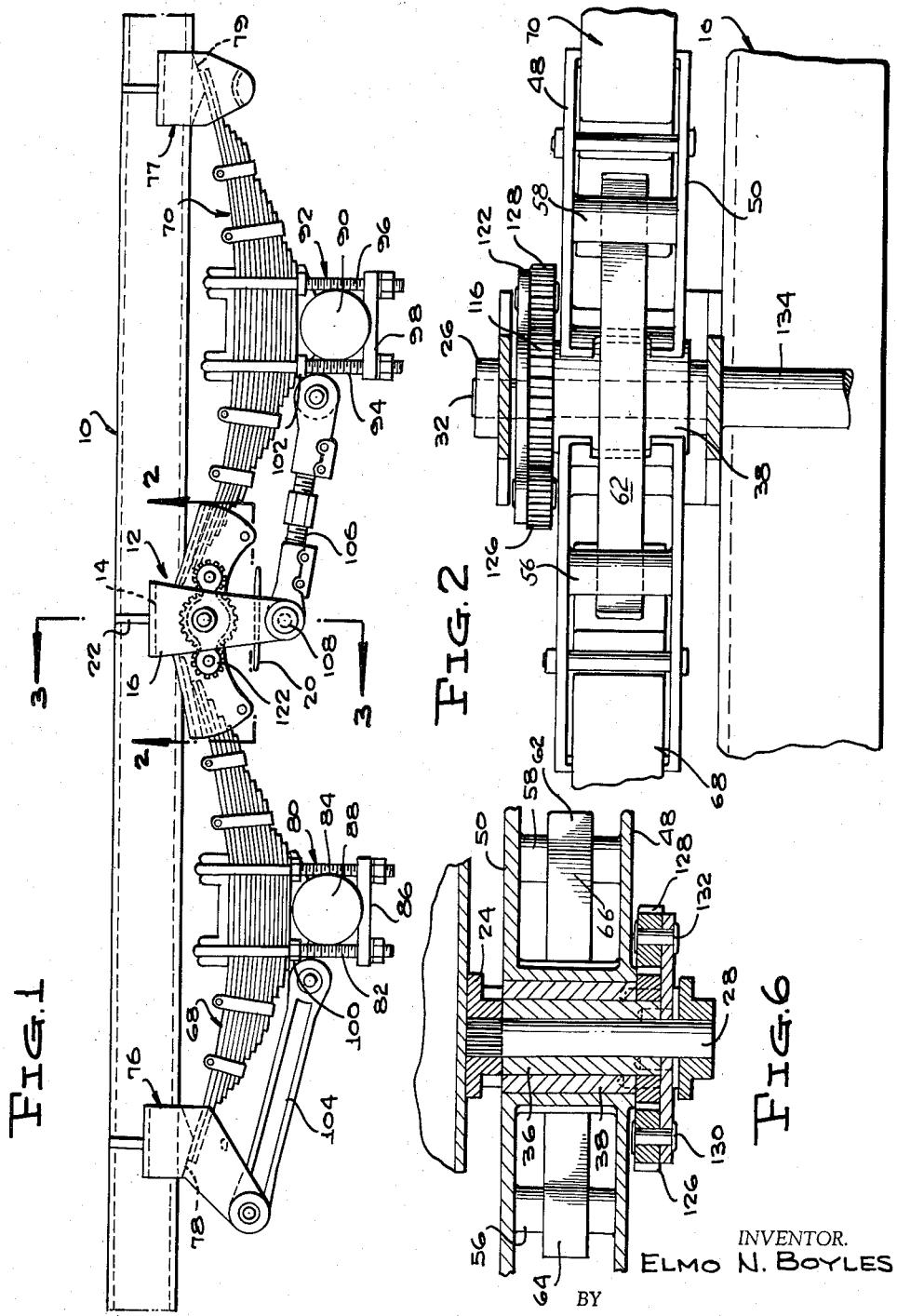

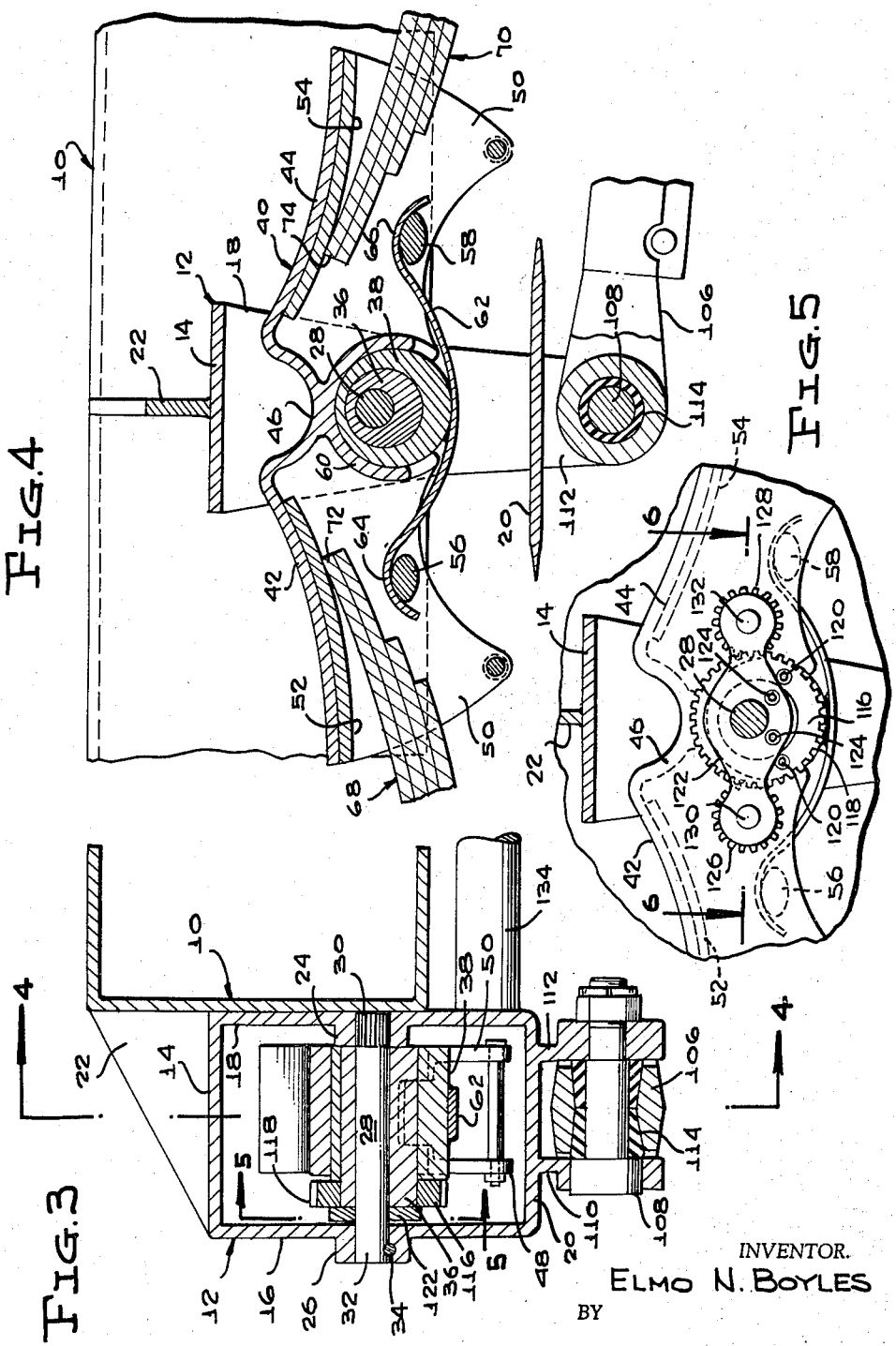

2,954,986

SUSPENSION SYSTEM FOR TANDEM AXLED VEHICLES

Elmo N. Boyles, Orlando, Fla.

Filed July 18, 1958, Ser. No. 749,361

3 Claims. (Cl. 280—104.5)

This invention relates to improvements in tandem axle spring suspensions, especially but not exclusively, for vehicles such as trucks and trailers.

It is among the objects of this invention to provide an improved leaf spring suspension assembly for supporting the frame of a vehicle, such as a truck, on tandem rear axles and equalizing the load between the axles as the axle carrying wheels encounter rises and depressions in the roadway.

It is a further object of this invention to provide an improved leaf spring suspension assembly of the type referred to above together with means so constructed that the parts of the spring suspension system cannot move to an irreversible position even when subjected to maximum movement of the axles relative to the frame.

A still further object of this invention is to provide a spring suspension system for a tandem axle vehicle which may be easily welded or otherwise rigidly secured to an existing truck frame.

This invention contemplates, as a still further object thereof, the provision of a spring suspension means for tandem axle trucks which is non-complex in construction and assembly, inexpensive to manufacture, and durable in use.

Other and further objects and advantages of the instant invention will become more evident from a consideration of the following specification when read in conjunction with the annexed drawings, in which:

Figure 1 is a side elevational view of a vehicle chassis frame member supported on tandem axles through a spring suspension system constructed in accordance with the present invention;

Figure 2 is an enlarged bottom plan view of the flare box and illustrating certain component elements of the instant invention, Figure 2 being taken substantially on the horizontal plane of line 2—2 of Figure 1, looking in the direction of the arrows;

Figure 3 is an enlarged detail cross-sectional view taken substantially on the vertical plane of line 3—3 of Figure 1, looking in the direction of the arrows;

Figure 4 is a longitudinal medial cross-sectional view taken substantially upon the vertical plane of line 4—4 of Figure 3, looking in the direction of the arrows;

Figure 5 is an enlarged fragmentary side elevational view of the flare box and certain elements of the present invention, Figure 5 being taken substantially upon the vertical plane of line 5—5 of Figure 3, looking in the direction of the arrows; and, Figure 6 is an enlarged detail cross-sectional view taken substantially upon the horizontal plane of line 6—6 of Figure 5, looking in the direction of the arrows.

Referring now more specifically to the drawings, reference numeral 10 designates a longitudinally extending chassis side frame member of a vehicle such as a truck or trailer (not shown), it being understood that the chassis includes a second side frame member extending parallel to the member 10, and that the mechanisms described below are duplicated thereon.

A spring suspension system is generally indicated at 12 and includes a one-piece casting bracket having a substantially inverted U-shaped configuration including a substantially rectangular bight member 14 from a pair of opposed ends of which depend a pair of spaced substantially parallel side walls 16, 18. A plate 20 is cast integral with the side walls 16, 18 adjacent their respective lower ends and extends substantially parallel to the bight member 14. From the central portion of the bight 14 rises a substantially triangular gusset plate 22 extending substantially perpendicular to the side walls 16, 18. The bracket 12 and gusset plate 22 are welded or otherwise rigidly connected to the frame member 10 in the conventional manner.

The side wall 18 is formed with a hollow boss 24 confronting the side wall 16, and the latter is formed with an externally positioned hollow boss 26 aligned with the boss 24. A stub axle or shaft 28 extends transversely between and is supported on the side walls 16, 18, the shaft 28 having a splined end 30 press-fit within the boss 24 and its other end 32 is fixedly retained in the boss 26 by means of a pin 34.

An elongated substantially cylindrical member 36 is eccentrically and loosely mounted on the stub shaft 28, and on the eccentric 36 is loosely mounted a second cylindrical member 38 which is also disposed in eccentric relation relative to the shaft 28.

Reference numeral 40 connotes, in general, a conventional flare box or equalizer having an inverted substantially U-shaped configuration and includes a pair of oppositely extending arms 42, 44, the adjacent ends of which are integrally connected by a bowed bight member 46. From the longitudinal sides of the arms 42, 44 and bight member 46, depend a pair of side walls 48, 50.

To the underside of the arms 42, 44 are secured, by conventional means, a pair of wear plates 52, 54, respectively, and disposed on each side of the bight member 46 and extending between and fixedly secured to the side walls 48, 50 are a pair of cam elements 56, 58 which serve a function to be described. Integral with the bight 46 is a downwardly curved arcuate journal 60 which journals the eccentric 38. To the high side of the eccentric 38 is welded or otherwise fixedly secured an elongated leaf spring 62 having oppositely disposed downwardly extending terminal ends 64, 66 which slidably engage over the upper sides of the cam elements 56, 58, respectively.

The adjacent ends of a pair of half-elliptical springs 68, 70 are housed within opposed ends of the flare box 40 with the uppermost leaf spring of each, 72, 74, bearing against the wear plates 52, 54. The remote ends of the springs 68, 70 are housed within inverted U-shaped spring hangers 76, 77 rigidly affixed to the frame member 10 and each is provided with a beveled wearing surface 78, 79, respectively, to reduce the wear on the other ends of the leaf springs 72, 74.

A conventional spring chair 80 including a first pair of inverted U-shaped bolts 82, 84 and a first clamp plate 86 connect the springs 68 with the first of a pair of tandem axles 88. A second conventional spring chair 92 includes a second pair of inverted U-shaped bolts 94, 96 and a second clamp plate 98 all of which serve to connect the springs 70 to the second of the tandem axles, 90. Each of the spring chairs 80, 92 also includes a conventional hanger or bracket member 100, 102, respectively, of which the bracket member 100 rotatably supports one end of a torque arm 104, the other end of which is pivotally connected on the hanger 76. In a similar manner, one end of an adjustable torque arm 106 is rotatably connected on the bracket member 102 while its other end is pivotally mounted on a pivot pin 108 extending between and supported on the side walls 110, 112 (see Figure 3). A bushing such as is indicated at 114 may be utilized.

A ring gear 116 having teeth 118 is rigidly secured by screws 120 to the eccentric 38 in eccentric relation relative thereto, that is, and referring in particular to Figures 3 to 5, the outer ends of the teeth 118 at the lower side of the gear 116 are disposed substantially in the curvilinear plane of the outer surface of the high side of the eccentric 38 while the outer ends of the teeth 118 at the upper side of the gear 116 project above the curvilinear plane of the outer surface of the eccentric 38 at its low side.

An elongated arm 122 has the center portion thereof rigidly connected at 124 to the eccentric 36 and is mounted for free rotation about the stub axle or shaft 28. Pinions 126, 128 are mounted for rotation on axles 130, 132, respectively, on the opposed ends of the arm 122, the pinions 126, 128 meshing with the gear 116 at opposed sides thereof. It should be here noted that with the device at rest, the axes of the stub axle or shaft 28 and the axles 130, 132 lie in a common horizontal plane.

The spring assembly is completed by connecting the opposed ends of a cross-rod 134 to a pair of adjacent side walls 18 at opposite sides of the vehicle chassis.

The suspension system operates in the following manner. Let it be assumed that a vehicle wheel carried on the axle 90 has encountered a raised obstruction over which it is to pass. Now while a portion of this thrust is absorbed by the springs 70, the same, to some extent, is transmitted to the flare box 40 via the leaf spring 74, the wear plate 54 and the arm 44. This thrust applies a torque tending to effect a turning or pivotal movement of the flare box 40 in a counter-clockwise direction as viewed in Figure 4, which in turn, applies a torque on the outer eccentric 38 since as the cam element 58 turns in a counter-clockwise direction (reference again being made to Figure 4), the arcuate end 66 of the leaf spring 62 raises and draws the spring towards it. Since the spring 60 is welded to the high side of the eccentric 38 torque is applied thereto causing it to turn in the same counter-clockwise direction. Now, the gear 116, being rigidly secured to outer eccentric 38 will also turn in the counter-clockwise direction.

The gear 116 in turning in the manner described, causes the pinions 126, 128 to rotate in a clockwise direction. Since these pinions are rotatably secured to the opposite ends of the arm 122, the latter turns in a clockwise direction. Now, the arm 122 being rigidly connected to the eccentric 36 causes it to turn in a clockwise direction substantially the same number of degrees that the eccentric 38 turns in the counter-clockwise direction. As the high side of the eccentric 36 moves upwardly from its lowermost position illustrated in Figure 4, it exerts a downward thrust on the stub axle or shaft 28 which tends to equal or neutralize the effect of the upward original thrust on the axle 90.

Should the wheel on the axle 90 drop into a depression in the road, the movements of the eccentrics and associated elements described above occur in reverse. Thus, under either of the two conditions, the chassis frame member 10 is maintained in its substantially normal horizontal position.

With the above arrangement, tandem axle fight is substantially reduced or eliminated and to improve the response of the suspension means it is preferred to make the ratio of the pinions to the gear two to one. The outside diameter of the outer eccentric 38 is substantially twice as large as the outside diameter of the inner eccentric 36.

Having described and illustrated one embodiment of this invention in detail, it will be understood that the same is offered merely by way of example, and that the present invention is to be limited only by the scope of the appended claims.

What is claimed is:

1. In a tandem axle spring suspension system for a vehicle adapted for connection with a chassis frame member of said vehicle, a bracket rigidly secured to said side frame member, a stub axle extending across said bracket and supported thereon, a substantially cylindrical member eccentrically mounted on said stub axle and freely rotatable thereon, a second cylindrical member eccentrically mounted on said first cylindrical member, a gear eccentrically mounted on one end of said second cylindrical member, an arm fixedly secured to one end of said first cylindrical member, a pinion mounted on each end of said arm and meshing with said gear on opposite sides thereof, a flare box having a pair of opposed arms from the opposed sides of which depend a pair of laterally spaced side walls, means rotatably supporting the adjacent ends of said arms on said second cylindrical member, cam means extending between and supported on said side walls on opposite sides of said second cylindrical member, resilient means connected with said second cylindrical member and slidably engaging said cam means, vehicle suspension springs rigidly secured to said tandem axles and engaging within said arms, whereby a force applied to one of said axles will effect a rotation of said flare box which turns said outer eccentric forcing said inner eccentric to turn in the opposite direction and apply a force in the opposite direction with respect to said first force to said stub axle.

2. In a tandem axle spring suspension for a vehicle adapted for connection with a chassis frame member for said vehicle, a stub axle fixedly secured to said frame member, eccentric means mounted on said stub axle, a flare box having a pair of opposed ends rotatably supported on said eccentric means intermediate said ends thereof, resilient means connected with said chassis and engaging the opposed ends of said flare box, and means connected with said flare box and said eccentric means for effecting movement of said axle in response to pivotal movement of said flare box.

3. In a tandem axle spring suspension of the type described in claim 1, wherein said resilient means comprises a leaf spring connected intermediate its ends to said second cylindrical member with the opposed ends of said leaf spring overlapping said cam means.

References Cited in the file of this patent

UNITED STATES PATENTS

| | | |
|---|---|---|
| 2,680,625 | Richardson | June 8, 1954 |
| 2,738,203 | Misic | Mar. 13, 1956 |